(12) United States Patent
Jacobi et al.

(10) Patent No.: US 10,740,240 B2
(45) Date of Patent: *Aug. 11, 2020

(54) METHOD AND ARRANGEMENT FOR SAVING CACHE POWER

(71) Applicant: International Business Machines Corporation, Armonk, NY (US)

(72) Inventors: Christian Jacobi, West Park, NY (US); Markus Kaltenbach, Holzgerlingen (DE); Ulrich Mayer, Weil im Schoenbuch (DE); Johannes C. Reichart, Highland, NY (US); Anthony Saporito, Highland, NY (US); Siegmund Schlechter, Lorch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,103

(22) Filed: Apr. 19, 2019

(65) Prior Publication Data

US 2019/0243767 A1 Aug. 8, 2019

Related U.S. Application Data

(63) Continuation of application No. 15/855,486, filed on Dec. 27, 2017, which is a continuation of application (Continued)

(51) Int. Cl.
*G06F 12/08* (2016.01)
*G06F 12/12* (2016.01)
*G06F 12/0862* (2016.01)

(52) U.S. Cl.
CPC .. *G06F 12/0862* (2013.01); *G06F 2212/1028* (2013.01); *G06F 2212/602* (2013.01); *G06F 2212/6026* (2013.01)

(58) Field of Classification Search
CPC combination set(s) only.
See application file for complete search history.

(56) References Cited

U.S. PATENT DOCUMENTS

| 6,535,959 B1 | 3/2003 | Ramprasad et al. |
| 7,330,941 B2 | 2/2008 | Sartorius et al. |

(Continued)

OTHER PUBLICATIONS

Jacobi et al., "Method and Arrangement for Saving Cache Power," U.S. Appl. No. 16/592,959, filed Oct. 4, 2019.

(Continued)

*Primary Examiner* — Yong J Choe
(74) *Attorney, Agent, or Firm* — Nathan M. Rau

(57) ABSTRACT

A computer implemented method for saving cache access power is suggested. The cache is provided with a set predictor logic for providing a generated set selection for selecting a set in the cache, and with a set predictor cache for pre-caching generated set indices of the cache. The method comprises further: receiving a part of a requested memory address; checking, in the set predictor cache, whether the requested memory address is already generated; in the case, that the requested memory address has already been generated: securing that the set predictor cache is switched off; issuing the pre-cached generated set index towards the cache; and securing that only that part of the cache is switched on that is associated with the pre-cached generated set index.

1 Claim, 6 Drawing Sheets

Related U.S. Application Data

No. 15/650,155, filed on Jul. 14, 2017, now Pat. No. 10,229,061.

(56) References Cited

U.S. PATENT DOCUMENTS

| | | | |
|---|---|---|---|
| 8,352,683 | B2 | 1/2013 | Cohen et al. |
| 8,972,665 | B2 | 3/2015 | Prasky et al. |
| 2002/0078122 | A1* | 6/2002 | Joy .................... G06F 9/3842 |
| | | | 718/102 |
| 2007/0113013 | A1 | 5/2007 | Knoth |
| 2008/0082753 | A1 | 4/2008 | Licht et al. |
| 2009/0138658 | A1* | 5/2009 | Dreslinski, Jr. ..... G06F 12/0864 |
| | | | 711/118 |
| 2010/0049912 | A1 | 2/2010 | Mylavarapu |
| 2010/0049953 | A1 | 2/2010 | Mylavarapu et al. |
| 2011/0093658 | A1* | 4/2011 | Zuraski, Jr. ........... G06F 9/3806 |
| | | | 711/125 |
| 2011/0219190 | A1 | 9/2011 | Ng et al. |
| 2013/0179640 | A1 | 7/2013 | Aggarwal et al. |
| 2014/0075156 | A1 | 3/2014 | Blasco-Allue et al. |
| 2014/0115264 | A1 | 4/2014 | Shirahige |
| 2014/0337605 | A1 | 11/2014 | Hall et al. |
| 2015/0089143 | A1 | 3/2015 | Licht et al. |
| 2015/0363318 | A1 | 12/2015 | Redford et al. |
| 2016/0275020 | A1* | 9/2016 | Huang ................ G06F 12/1433 |
| 2016/0342530 | A1* | 11/2016 | Pellerin, III ........ G06F 12/0895 |
| 2016/0357681 | A1* | 12/2016 | Reed .................... G06F 12/0864 |

OTHER PUBLICATIONS

Jacobi et al., "Method and Arrangement for Saving Cache Power," U.S. Appl. No. 16/592,993, filed Oct. 4, 2019.
List of IBM Patents or Patent Applications Treated as Related, Signed Oct. 4, 2019, 2 pages.
Calder et al., "Predictive Sequential Associative Cache," HPCA '96: Proceedings of the 2nd International Symposium on High Performance Computer Architecture, Feb. 1996, 10 pages.
Jacobi et al., "Method and Arrangement for Saving Cache Power," U.S. Appl. No. 15/650,155, filed Jul. 14, 2017.
Jacobi et al., "Method and Arrangement for Saving Cache Power," U.S. Appl. No. 15/855,486, filed Dec. 27, 2017.
Jacobi et al., "Method and Arrangement for Saving Cache Power," U.S. Appl. No. 15/855,524, filed Dec. 27, 2017.
List of IBM Patents or Patent Applications Treated as Related, Signed Apr. 19, 2019, 2 pages.

* cited by examiner

METHOD AND ARRANGEMENT FOR SAVING CACHE POWER

BACKGROUND

The present disclosure relates to the field of caches in a processor, and, in particular, to saving power consumed by a cache.

A cache is a circuitry combined with switching logic that are arranged to keep a processor's access time to fetch data from memory, be it data or instruction data, as short as possible. This because, in recent years, processor velocity has grown considerably faster than the velocity for accessing memory. Thus, data that has already been fetched from main memory is intermediately stored in a buffer called cache, the cache is arranged very close to the processor, and is very fast though small piece of memory. To increase processor velocities without correspondingly increasing the velocity of the main memory, additional buffer (cache) levels are found in the cache.

Nowadays, several cache levels are spread over a computer system, a level 1 cache being arranged most closely on the processor die. Usually, a processor may comprise a level 1 data cache, a level 1 instruction cache, and a level 2 cache. A level 3 cache and main memory may be distributed over the computer system.

Due to higher performance requirements and high clock rates, the energy consumption of a cache has grown considerably.

SUMMARY

Various embodiments provide for a computer implemented method for saving cache access power, a cache circuitry, a processor, and a computer program product to save cache access power. Advantageous embodiments are described in the dependent claims. Embodiments of the present invention can be freely combined with each other if they are not mutually exclusive.

In one aspect, the invention relates to a computer implemented method for saving cache access power, the cache being provided with a set predictor logic for providing a generated set selection for selecting a set in the cache, and with a set predictor cache for pre-caching generated set indices of the cache, the method comprising: receiving a part of a requested memory address; checking, in the set predictor cache, whether the requested memory address is already predicted; in the case, that the requested memory address has already been generated: securing that the set predictor cache is switched off; issuing the pre-cached generated set index towards the cache; securing that only that part of the cache is switched on that is associated with the pre-cached generated set index.

In a further aspect, the invention relates to a cache circuitry comprising a cache that is arranged to receive a part of a memory address and to output hitting data; a set predictor logic that is arranged to generate, based on the received part of the memory address, the next set to be selected; a set predictor cache that is arranged to store a part of a memory address and a corresponding set index, the set index pointing to the set in the cache storing the data from the requested memory address, wherein the set predictor is arranged to be able to secure that the predictor cache is switched off and that a part of the cache that does not contain the requested data is switched off.

In a further aspect, the invention relates to a cache circuitry.

In a further aspect, the invention relates to a computer program product.

BRIEF DESCRIPTION OF THE DRAWINGS

A detailed description of the disclosure is given in the following drawings in which.

DETAILED DESCRIPTION

Figure 1:
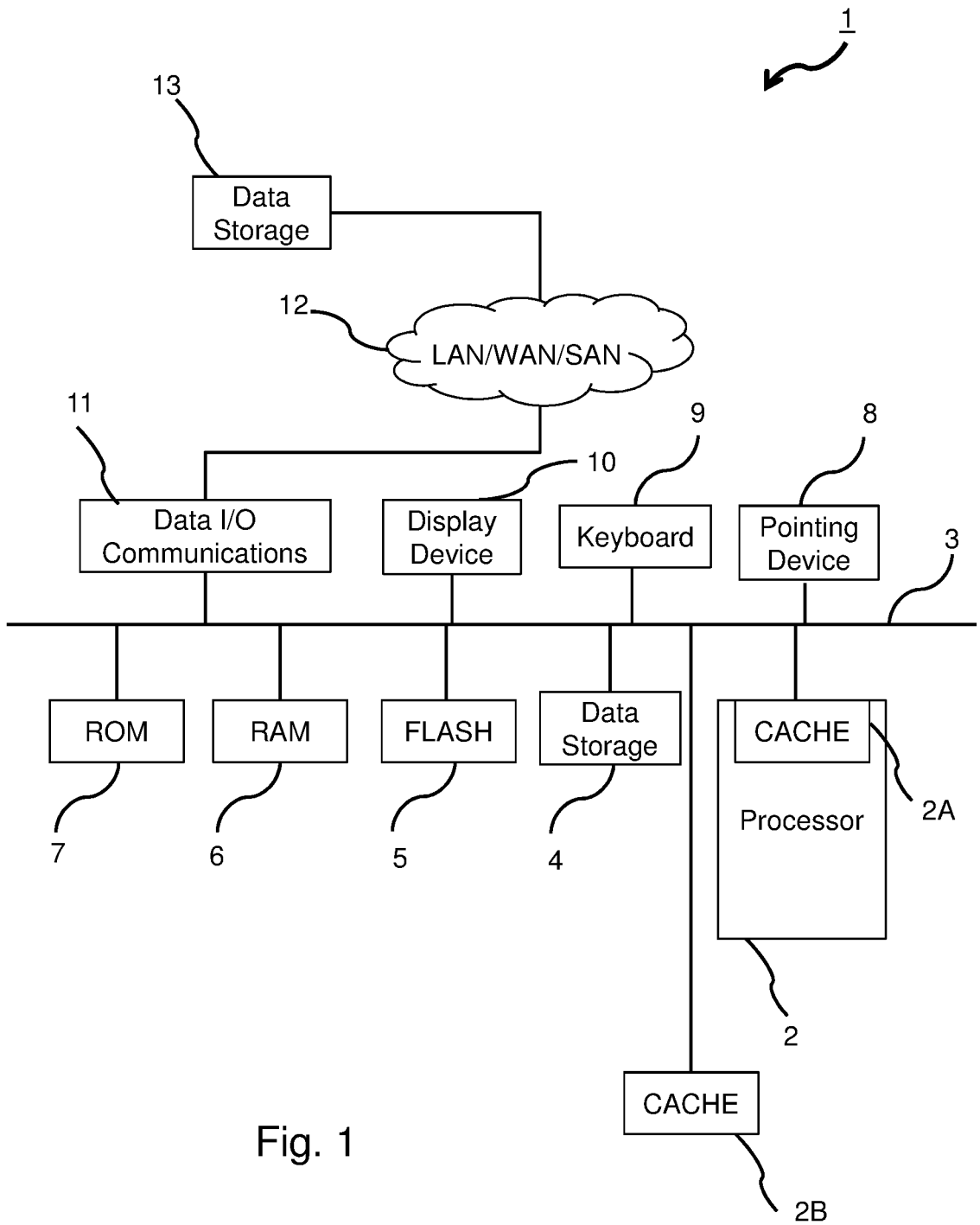
FIG. 1 shows a block diagram of a computer processing system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method as described below may provide for saving cache access power.

The cache, the described method is applied to, may be provided with a set predictor logic for providing a generated set selection for selecting a set in the cache. The skilled person will understand that such set selection is generated for the purpose of predicting an address and/or data that might be required in near time. Thus, in the following, instead of the verb "generate" in any of its form, instead, in some text passages, the verb "predict" will be used in the corresponding grammatical form.

The set predictor logic may also be referred to as "set predict array". A set predictor may have an advantage in that, when access to a memory address is required, usually, a tag part of the memory address is issued to the comparators of an associative cache. In relation to a main memory, the tag part might be considered to represent a beginning of a memory page, whereas an index part of the memory address might be considered to represent memory addresses from within a main memory page. The comparators will then compare the tag part of the required memory address with all the stored tags, thus providing an associative cache. Data of the cache will be output, if a corresponding tag and matching index is found—the index corresponding to a set in the cache. Such comparisons may be costly in time.

The set predictor logic may provide an advantage in that it comprises, for a given tag, a set index where the requested data may be found. In this regard it may be noted that the requested data may be data itself or instruction data.

The cache, the described method is applied to, may further be provided with a set predictor cache for pre-caching generated set indices of the cache.

The set predictor cache may be a kind of pre-cache before the cache. The input towards the set predictor cache may be a part of the requested address, the output of the set predictor cache may be an index referencing a set in the cache. A set predictor cache may have an advantage in that accesses to hit results are very rapid. A hit result, as used herein, refers to a memory address and contents and/or data and/or instruction that have successfully been found and stored in the cache.

The method may further comprise receiving a part of a requested memory address.

The method may further comprise checking, in the set predictor cache, whether the requested memory address is already generated. In this regard, "generated" may mean that in advance a hit had already been encountered. However, "generated" or "predicted" may also mean that, based on history data that is evaluated by employing hit counters and miss counters, it may be assumed that such data is going to be requested in one of the next steps in the pipeline.

The method may further comprise, in the case, that the requested memory address has already been generated or found: securing that the set predictor cache is switched off.

As the set predictor circuitry is very power consuming, it may be advantageous to have the possibility and flexibility to switch parts of the set predictor circuitry off. This may be also advantageous in cases where the set predictor logic is being executed very rapidly, thus having a high power demand. Switching off parts of the circuitry may be achieved by gating parts of the relevant circuitry or letting it sleep.

The method may further comprise issuing the pre-cached generated set index towards the cache. This may have an advantage in that the cache receives an information as to which set contains the data to be retrieved. Thus, in the case the relevant data is already stored in the set predictor array, it is not necessary to employ the cache logic for retrieving— or trying to retrieve—the referred data, the data may be accessed at the same instant.

The method may further comprise securing that only that part of the cache is switched on that is associated with the pre-cached generated set index. This may have an advantage in that additional power is saved. "Switching on" as used herein shall mean switch a part of the related circuitry on or leaving it on. Switching the relevant part of the circuitry on may be achieved by gating the relevant parts of the circuitry, or, awakening them from sleep. In particular, "switching on a part of a circuitry component" may also comprise switching off the other parts of the same circuitry component.

According to one embodiment, the method may comprise, when checking, in the set predictor cache, whether the requested memory address is already generated, that the checking is performed on an associative basis, comparing the hitting stored address parts in the set predictor cache with the received part of the requested memory address. This may have the advantage that the set predictor cache functions as a kind of pre-cache before the cache. In other words, a requested memory address or part thereof may be issued to the set predictor cache. The set predictor cache may already have a couple of entries of a part of an address along with a corresponding set index of the cache. Thus, such pre-cache might be regarded as a directory for the cache. An advantage thereof may be, that a cache entry may be retrieved more rapid than if searched for directly in the cache. Further, there may be an advantage in that the set predictor cache may contain generated cache accesses, thus providing extraordinary access to cache contents.

According to one embodiment, the referred stored sets may be hitting sets. Thus, a good processor performance— seen as a whole—might be achieved. Hitting set, as used herein, denotes a set in the cache storing contents from the memory resulting from a successful hit access.

According to one embodiment, issuing the pre-cached generated set towards the cache is performed by bypassing the set predictor logic. This may have the advantage that, in the case of a hit, it is not necessary to power on the set predictor logic, that may be power consuming. It is considered to not completely power on or off the set predictor logic, but to power on or off the relevant parts for performing its regular task, whereas, for the sake of switching on or off a part of the cache, the relevant parts for performing the set predictor logic's regular task may be bypassed.

According to one embodiment, securing that the set predictor cache is switched off comprises switching off the set predictor cache, or, leaving the set predictor cache switched off. In other words, it is organized for having the set predictor cache, or the unnecessary parts of it, securely switched off. Thus, a better effect of saving energy consumption in the cache may be achieved.

According to one embodiment, securing that only that part of the cache is switched on that is associated with the pre-cached generated set index comprises switching off or leaving switched off a part of the cache that is not associated with the pre-cached generated set index.

This may have the advantage that the also power consuming cache is not completely supplied with power, but only as far as is necessary. In particular, it is considered to switch off or switch on parts of the cache on a set index based manner. For example, a first part of the sets of the cache may be switched off, a second part of the sets, that contain the data as required by the issued memory address and as indicated by the set index from the set predictor cache, may be switched on, whereas as third part of the cache may remain switched off. There is also consideration to switch on or switch off only one half of the cache, respectively.

It may further be considered, securing that, when the set predictor cache is switched off, then the set predict array is switched on, and, when the set predictor cache is switched on, then the set predict array is switched off.

According to one embodiment, checking whether the requested memory address is already generated comprises checking, whether the hitting set index is stored. This may have an advantage in that it may be secured that switching on or off respective parts of the cache will only be performed when it is known that valid data is stored in the cache.

According to one embodiment, the memory address may be an address in a higher level memory that may be at least one of a higher level cache or a main memory.

According to one embodiment, the cache may be at least one of an instruction cache, a data cache, a level 1 (L1 level) cache, a level 2 (L2 level) cache, a level 3 (L3 level) cache.

According to one embodiment, the received part of memory address may be partitioned into a tag and an index.

According to one embodiment, the switched-on part of the cache is a set or a number of sets of the cache. The switched-on part of the cache, that may denote the respective part of the cache that is switched on, may be a set, only, or a number of sets from the cache.

According to one embodiment, switching on only that part of the cache that contains the generated set comprises issuing the generated set index towards the cache. This may have the advantage that the set index is already found, and no necessity arises to activate or remain activated the cache logic that would otherwise be employed to work with the correct set index.

According to one embodiment, the cache may be an instruction cache.

According to another aspect, a cache circuitry may be provided, comprising a cache that is arranged to receive a part of a memory address and to output hitting data; a set predictor logic that is arranged to generate, based on the received part of the memory address, the next set to be selected; a set predictor cache that is arranged to store a part of a memory address and a corresponding set index, the set index pointing to the set in the cache storing the data from the requested memory address, wherein the set predictor is arranged to be able to secure that the predictor cache is switched off and that a part of the cache that does not contain the requested data is switched off.

According to one embodiment, the cache circuitry may be arranged to perform one or more of the above described method steps.

According to another aspect, computer program product to save cache access power, the computer program product comprising: a computer readable storage medium having computer usable code embodied therewith, wherein the computer readable storage medium is not a transitory signal per se, the computer usable program code being arranged to cooperate with a cache, the cache being provided with a set predictor logic for providing a generated set selection for selecting a set in the cache, and with a set predictor cache for pre-caching generated set indices of the cache, the computer usable program code comprising: computer usable code configured for receiving a part of a requested memory address; computer usable code configured for checking, in the set predictor cache, whether the requested memory address is already generated; and computer usable code configured for in the case, that the requested memory address has already been generated: securing that the set predictor cache is switched off; issuing the pre-cached predicted set index towards the cache; securing that only that part of the cache is switched on that is associated with the pre-cached generated set index.

The present disclosure may be a system, a method, and/or a computer program product. The computer program product may include a computer readable storage medium (or media) having computer readable program instructions thereon for causing a processor to carry out aspects of the present disclosure. While the above paragraphs use the phrase "according to one embodiment," it should be noted that these embodiments are not necessarily mutually exclusive, and as such the features may be combined with each other.

The computer readable storage medium can be a tangible device that can retain and store instructions for use by an instruction execution device. The computer readable storage medium may be, for example, but is not limited to, logic implemented on a semiconductor chip, as, e.g., a storage medium for comprising microcode instructions for the internal logic of a processor chip, a Field Programmable Gate Array (FPGA), an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a cache, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, or, equivalent to a programming language applied to control a processor chip's hardware behaviour, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In embodiments, a processor may comprise a cache. A "cache", as is used herein, refers to a specific kind of computer memory, in particular a hardware memory that is used by a central processing unit (CPU) of a computer to reduce the average cost (in time) to access data from a main memory. Such cache may be a faster, smaller memory, i.e., faster and smaller compared to the main memory, that is arranged relatively close to a core of the processor which may store copies of the data from one or more frequently used main memory locations. The cache may be arranged directly on the semiconductor chip whereupon the processor core is implemented or may be arranged communicatively coupled to the CPU. A cache may be part of a cache hierarchy comprising multiple levels, i.e., a so-called L1-cache may be arranged most closely to the processor's core, an L2-cache might be provided that is arranged downstream from the L1-cache when seen from the core, and, an L3-cache might be provided downstream from the main memory. The L1-cache, that is most closest to the core, may be very small, very fast, very expensive, and relatively high energy consuming.

Further, a cache may serve different purposes. For example, in embodiments, an instruction cache, sometimes also denoted as "I$", might be arranged for keeping the processor instructions most recently fetched from the main memory. This may have an advantage of keeping code, as for e.g. loops, close to the core so that the instructions may be transported without or almost without any latency towards the core. In another example, a data cache might be arranged for. A structure and control logic may differ between an instruction cache and a data cache, because, usually, instructions will not be modified, whereas, when modifying data and storing the data into the main memory or even intending to write them to the disk, a risk of possibly inconsistent states between the data in the data cache and the data in the main memory has to be taken care of. This means, the instruction cache serves speeding up instruction fetches, the data cache serves speeding up fetch and restore with regard to the main memory or, at least, a next-level cache.

In the following, "data" will be used to generically denote "data" or "instructions" unless the content requires otherwise.

If not specified otherwise, "cache" is used for a cache of any of the cache-levels. If not specified otherwise, "memory" may also mean "the next higher level" cache, in order to keep the description readable.

Data may be transferred between main memory and cache in blocks of fixed size, called cache lines or cache block. When a cache line is copied from main memory into the cache, a cache entry may be created. Such cache entry may comprise the copied data and a so-called "tag". A "tag" as referred herein denotes a part of the main memory address of interest. Data may be marked to be valid or not by maintaining a "valid flag" for each set.

A further part of the main memory address of interest may be denoted as "index" and may be directly associated with an access unit within the cache. A further part to be used as part of a memory address, e.g. an offset, is considered. Thus, the main memory may be regarded as structured—when seen from the cache—in blocks of fixed size, wherein each block begins at the main memory address that is defined by the tag plus following zeros. The size of each block is then defined by the power of two of the sum of the index bits plus the offset bits, if any.

When trying to load data from cache, two distinct events may occur: Either a cache hit happens—in this case, the associated data might be loaded into the CPU. Or, a cache miss happens—in that case, a relatively expensive access to a higher level and more slowly memory may be tried.

In the case, the cache is a data cache, having the task also to buffer write accesses to memory, different write policies are considered, as for, e.g., "write-through", meaning immediately writing the modified data to memory, or "writeback", meaning that the data is only written, when it is tried to fetch it. For keeping track of the difference between the valid data in the cache and the invalid data in the memory, an additional flag is provided, the so-called "dirty flag".

A cache may be embodied differently according to associativity. A so-called direct-mapped cash exhibits zero associativity: When each entry in main memory can be placed into one unique place in the cache only, exhibiting good answer times in best cases but very long times in a worst case. On the other hand, at the other extreme, a fully associative cache allows the data to be placed anywhere in the cache, providing the best miss rates, but relatively expensive because of the large number of comparators needed.

As the skilled person might be aware of, a medium associativity may be thrived for, e.g., a 2-way associative cache. In such a case, an m bit memory address might be partitioned as a left part of the m−s−1 left bits for the tag, the most right standing bit for the offset, and s bits for the index. In embodiments, a 2-way associative cache may be considered, but direct-mapping and higher associativity are considered, too.

An instruction pipeline, in an embodiment, is a means for implementing a form of parallelism, i.e. instruction-level parallelism, within a single processor. As a result, faster CPU throughput is provided, i.e. the number of executions that can be executed in a unit of time than would be otherwise possible at a given clock rate. A basic instruction cycle is broken up into a series called a pipeline.

For example, a basic five-stage instruction cycle might comprise steps of: instruction fetch (IF), instruction decode (ID), execute (EX), memory access (MEM), register write back (WB). These steps may be broken down, so that, in one clock cycle, different stages of instructions may be executed, only as an example: While a first instruction is almost finished and might want to write a result to memory, a second instruction might be executed, whereas a third instruction is just being decoded and a fourth instruction being fetched from memory, all in one and the same clock cycle. Thus, as the skilled person is aware of, overall execution may be relatively fast. Embodiments consider different stage numbers in a pipeline.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A block diagram illustrating an example computer processing system adapted to implement the methods of the present disclosure is shown in FIG. 1. The computer system, generally referenced 1, comprises a processor 2 which may comprise a digital signal processor (DSP), central processing unit (CPU), microcontroller, microprocessor, microcomputer, ASIC or FPGA core. The processor 2 may comprise a cache 2A, that might be an instruction cache or a data cache or two caches serving as instruction cache, data cache, respectively. The cache 2A may be a first level cache or L1-cache.

The system may also comprise static read only memory 7 and dynamic main memory 6 and may also comprise a FLASH memory 5. Further, the system may comprise a higher-level cache, e.g., a second level cache or L2-cache or a third level cache or L3-cache. It is considered to have a higher level cache between the processor and any further memory device. It is also considered to have the L1-cache 2A directly connected to a core (not shown) of the processor and the higher-level cache 2B directly on the processor, to be shared between the different processor's cores. The processor 2 may be, via a bus 3, in communication with any of said memory devices as well as with peripheral devices such as a display device 10, a keyboard 9, a pointing device 8, such as, e.g., a mouse or a tablet.

In embodiments, the computer system may be connected to one or more external networks such as a LAN or WAN or SAN 12 via communications lines connected to the system via one or more data I/O communication interfaces 11, e.g. a network interface 11. The network adapters 11 coupled to the system enable the data processing system to become coupled to other data processing systems or remote printers or storage devices through intervening public or private networks. Modem, cable modem and Ethernet cards are just a few of the currently available types of network adapters. The system comprises also a magnetic or semiconductor based data storage or storage device 4 and/or 13 for storing application programs and data. The system comprises computer readable storage medium that may include any suitable memory means, including but not limited to, magnetic storage, optical storage, semiconductor volatile or non-volatile memory or any other memory storage device.

Figure 2:
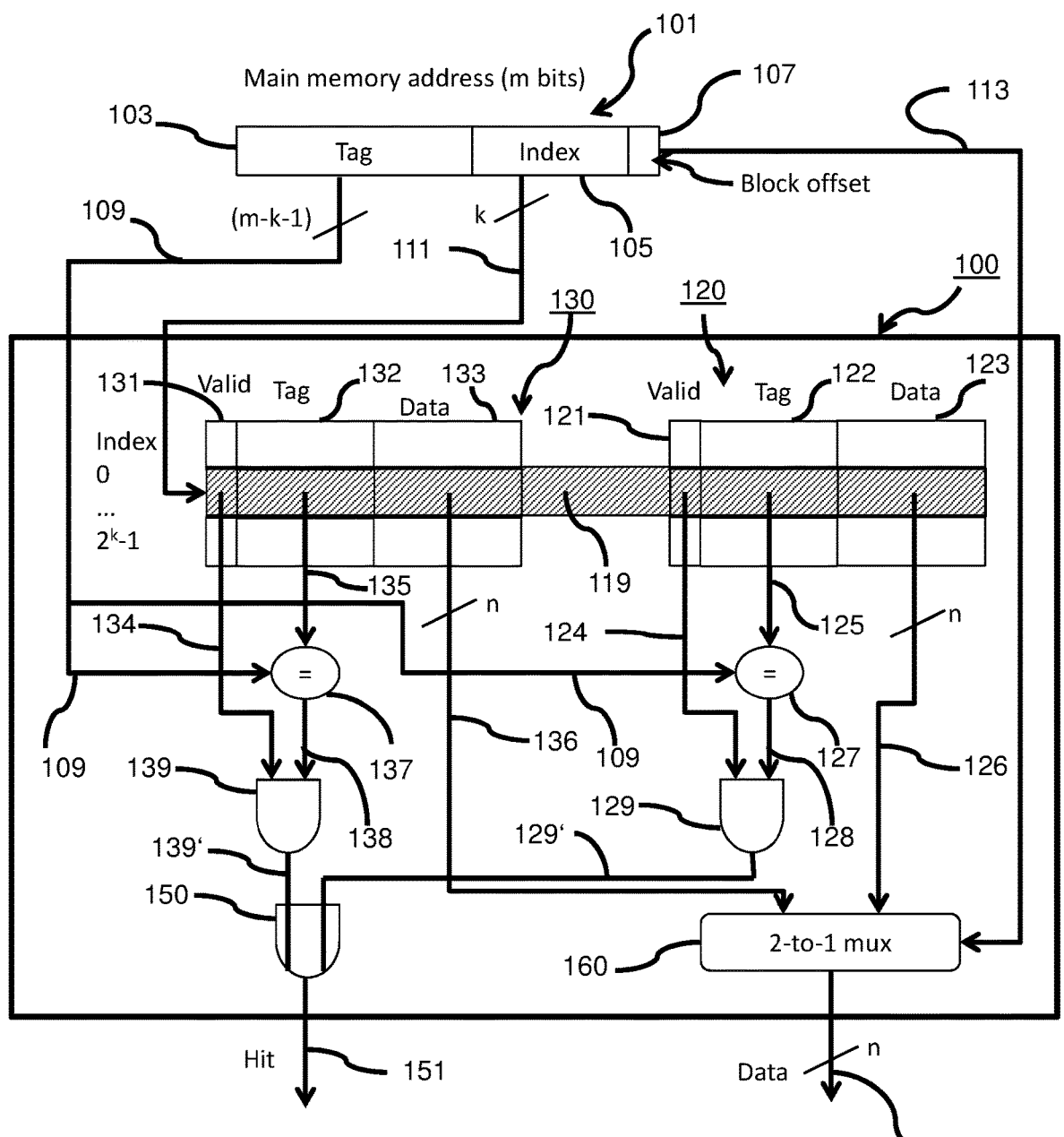
FIG. 2 shows an example 2-way set associative cache implementation.

A simplified block diagram illustrating an example 2-way set associative cache implementation adapted to implement aspects and embodiments of the present disclosure is shown in FIG. 2.

A 2-way set associative cache may be depicted by reference numeral 100. The selection of a 2-way set associative cache is not intended to limit the scope of the disclosure. Also higher associative caches are considered. However, for the sake of readability and as example only, herein, a 2-way associative cache is referred to. The skilled person will easily understand that the data that is to be fetched may be instructions, i.e. instruction data, or data as such, without limiting the teaching set forth below.

A main memory address 101 being defined by, e.g., m bits, may be partitioned into a tag 103 consisting of the left $(m-k-1)$ bits, an index 105 consisting of the following k bits and a block offset 107 having, in the case of a 2-way associative cache, only 1 bit. In the case of an, e.g. 8-way associative cache the length of the block offset would be 3 bits.

Numeral 100 depicts the two-way set associative cache. Tag 103 is fed via tag line 109, index 105 is fed via index line 111 and the block offset 107 is fed via block offset line 113 into the cache 100.

The cache 100 further comprises two memory banks 120 and 130. The structure of the two memory banks can be considered as identical, so that the following discussion concentrates on memory bank 120, wherein it is to be understood that similar numerals refer to similar entities and similar if not identical functionality.

Memory bank 120 consists of several columns and several lines. The columns are a valid flag 121 identifying as to whether the corresponding data 123 is valid or not, a tag column 122, and a data column 123. The width of the data may be n bits. The width of the tag column 122 is the same as the width of the tag 103, i.e., $(m-k-1)$.

The memory bank 120 consists of $(2^k)$ lines, corresponding to the address room of the index 105.

It is to be noted that, though in the present figures both memory banks 120 and 130 are provided with separate valid columns 121 and 131 and separate tag columns 122 and 132, only one valid column and only one tag column are provided. In embodiments, this is sufficient to establish a working cache.

Via line 11, carrying the index value 101 from the main memory address 101, a line 119 is selected in both memory banks. Such line 119 is also referred to as "set" that comprises at least all the data values 123 and 133 of the selected line, that is selected via the index 101.

Memory bank 120 provides a line 124 for outputting the value of a selected valid flag of column 121, a line 125 for outputting the tag value, and a line 126 for outputting the data value of column 123.

With the help of comparator 127, the tag value 109 of the required main memory address 101 may be compared to the tag value 125 from the index selected tag column 122. If both tags are identical, the comparator 127 sends via line 128 a logical "1" to AND-gate 129. Also, the corresponding, index selected value of the valid column is sent, via line 124, to the other input of the AND-gate 129. If both input lines 124 and 128 are on a logical "1", also the output 129' of the AND-gate 129 will be a logical "1". As the output 129' of the AND-gate 129 establishes an input line of an OR-gate 150, the cache 100 will output on line 151 a logical "1" meaning a "cache hit".

The skilled person understands that the same functionality is performed by memory bank 130. Further, it is considered that only one column for the "valid" flag, e.g., column 131, and only one column for the "tag", e.g., column 132, may be necessary, the corresponding columns 121 and 122 being omittable. Thus, it is considered to have only one memory bank having columns 131 and 132 for validity and index selection, and columns 133 and 123 for the data values.

When, in this way, it has been found out that there is a cache hit, it is necessary to decide which data, or block, of the two memory banks has to be transferred to the CPU or, the core. This is achieved by evaluating the block offset 107, that is outputted via line 113 to form the input of a multiplexer 160, i.e., a 2-to-1-multiplexer 160. Based upon the block offset signal 113, the multiplexer 160 selects one of data signals 136 from data column 133 or data signal 126 from data column 123. It is to be noted that, as both data values are already index selected, the correct data may be transferred via cache output 161 towards the CPU or core.

For the reason of clarity, CPU and core are not depicted herein.

To summarize, the main memory address 101 is partitioned or split into several parts, that serve different addressing functionality. In this regard, the main memory may be regarded as being split up in ($2^{(m-k-1)}$) memory blocks, each having ($2^{(k+1)}$) e.g., bytes or words.

Figure 3:
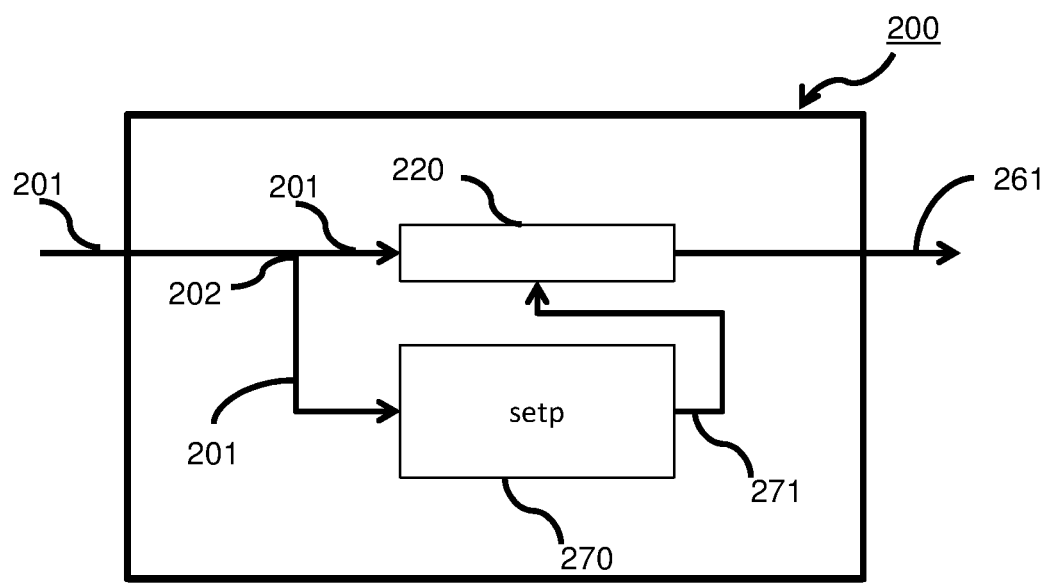
FIG. 3 shows an exemplary block diagram of a cache.

FIG. 3 depicts a block diagram, of an embodiment, of a cache 200 that is provided with a set predict array, setp, shown as 270. Cache 200, in this example, may be embodied as instruction cache. The cache 200 comprises a memory bank 220 that is built up analogously to memory banks 120, 130 of FIG. 2, and is provided with analogous functionality that has been omitted in this illustration for the sake of clarity.

A requirement for an instruction to be fetched from a main memory location is forwarded via line 201 towards cache 200. The skilled person will understand that FIG. 3 does not necessarily show a complete cache, but depicts only the part relevant for the present discussion.

In an exemplary embodiment, the cache may comprise 128 kByte and be 8-way-associative. One cache line that establishes the smallest managed unit of the cache may comprise 256 bytes. In the case of a 64 bit logical address, thus, the eight logical address, LA, bits 56 to 63, also denoted as "56:63", consequently, correspond to the byte index of the cache line.

Such exemplary L1-cache may hold, as a maximum, 128 kBytes/256 bytes=512 cache lines. From these, 8 cache lines may be stored in a "row", because the cache is 8-way-associative. As a result, 512/8=64 rows may be provided. Out of these 64 rows, one row may be selected by the bits 50 through 55 of the logical address, which might be denoted as LA.50:55.

The setp may predict or estimate which of the, in this example eight, sets or ways will assumably be the correct one, or, in other words, the setp may generate the appropriate reference.

The skilled person will understand that there may be a component that checks whether the setp has predicted correctly. This component would work slower than the logic presented herein. It is considered that the confirmation that the correct data have been read will be calculated 2 cycles later. Until then, the predicted data will already be used speculatively.

In the case, the setp has made a wrong guess, the speculative results will be dismissed. Additional logic will then organize for keeping the desired data safely in the cache and for the setp in future making correct guesses or estimates or predictions.

In other words, at a later point of time, the unsuccessful access will be repeated and then setp is expected to correctly predict.

Still referring to FIG. 3, the line 201 branches in branch point 202 and is identically forwarded towards the memory bank and the set predict array 270. The output of the set predict array 270 is forwarded via line 271 towards the memory bank 220. A control logic, not shown herein for the sake of clarity, that is arranges in cache 200, helps selecting the correct set from the memory bank 220. Subsequently, the correct set is output via line 261 from the cache towards the core or CPU. The output 261, in this example, may also be referred to as instruction cache array content, ICAC.

The set predict array 270 makes a prediction as to which set of the memory bank 220 is going to be accessed. In other words, the set predict array 270, that is a small and therefore fast array with additional compare logic, may allow for a prediction of the hitting cache set fast enough to use its output as late select input for the cache array, which may be much faster than a regular directory lookup.

A regular directory lookup may be illustrated as follows: To be sure whether setp has done a correct prediction, the complete LA, an address space control element, ASCE, i.e., start of the address translation tables, unique identification of the logical address space and further administrative data have to be compared, as is depicted with regard to reference numeral 120 in FIG. 2. A cache hit is only occurred, if these parameters of the actual cache access are in correspondence with the data that are stored in the directory for the cache coordinates (row, way).

The set predict array 270 may have a subset of the logical line address for each valid line or set in the cache memory bank 220. For example, the set predict array 270 may have the index part of the required main memory address, however, only the index part of those sets, that are valid. Any other sub part of a required main memory address may be employed.

In other words, in an example, the aforesaid may be depicted as follows: Cache array, setp and directory might be organized as tables, each having 64 lines and 8 columns. In the cache array, in each line, 256 bytes of data may be stored, that are copies of 256 bytes from main memory. In setp in each line are stored: LA.37:49, th0 vld, th1 vld.

In the directory, in each line are stored the parameters (LA, ASCE, . . . ) that had as an effect that the line has been written and/or installed into the cache.

Then, via LA.50:55, a line might be selected. In the setp cache—having 6 entries total only—may be stored: LA.37:50, th0 vld, th1 vld, and L1 set ID.

When accessing a row in the cache, the same row of the set predict array is accessed.

In the set predict array, the data for that row is read and compared to the current access logical line address.

The hit/miss indication for each set to the cache array is used as late select for the cache array. A hit may be determined if the content of the required main memory address is in the storage bank, see, for example, FIG. 2, reference signs 137, 139, 150.

The set predict array is therefore designed to be very fast. However, as a consequence, the set predict array exhibits a high power consumption. That can be seen, e.g. by means of thermal pictures of the active processor, that show the set predict array or the set predict arrays to be the most power consuming parts of the whole processor chip.

It is known that Instruction fetches typically access the same lines multiple times, e.g. for loops.

In an embodiment, it is considered to reduce the power consumed by the set predict array by remembering a few entries of the set predict on the side, in a so called set predict array cache, or, short: setp cache.

Whenever possible, it may be intended use the setp cache instead of accessing the set predict array.

The skilled person understands that 220 is the cache container holding the data from memory, e.g., data arrays/SRAM. The component referred to by reference numeral 270 may be generating the late select. However, the skilled person will understand that setp is always correct. In order to detect such cases, a directory may be needed.

Figure 4:
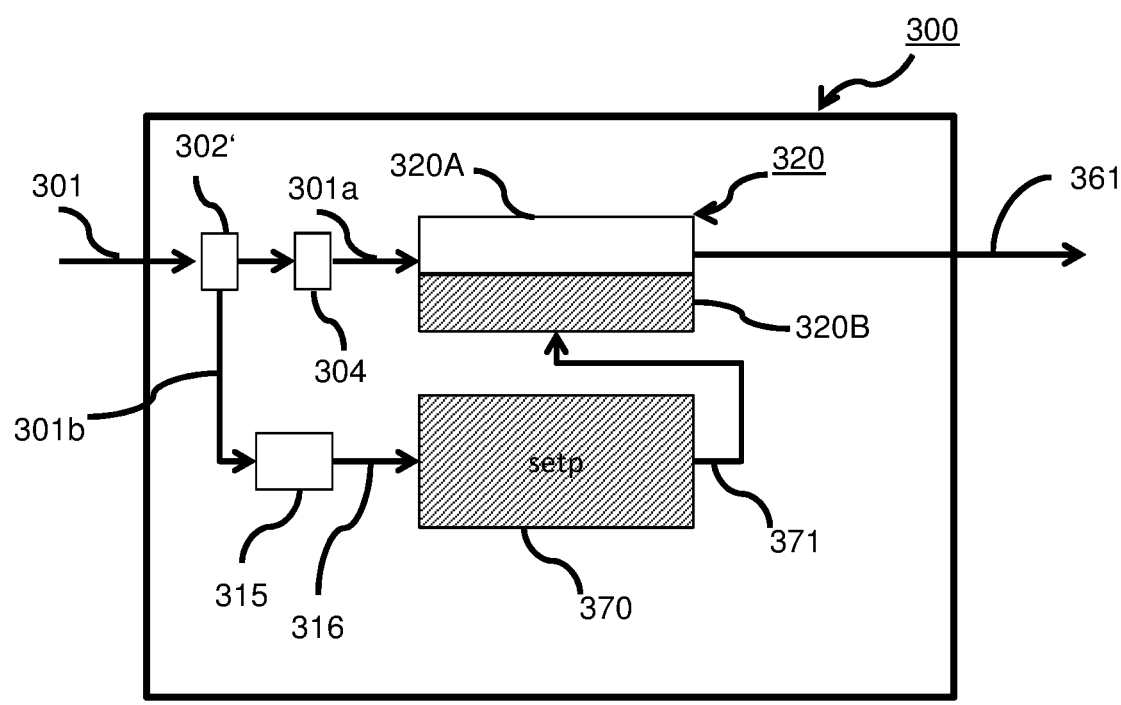
FIG. 4 shows a further exemplary block diagram of a cache that is provided with a set predict array.

FIG. 4 depicts a block diagram, of an embodiment, of a cache 300 that is provided with a set predict array, setp, 370. Reference numerals similar to those of FIG. 3 have similar meaning and functionality so that discussion is omitted to avoid repetitions where possible.

A requirement for an instruction, or data, to be fetched may be forwarded via line 301 to cache 300. In an example, a logical address "LA.50:55", that is, bits 50 to 55 of a 64-bit address, might be forwarded to cache 300. At 302', the logical address is subdivided into an address part 301a that is forwarded to memory bank 320 and an address part 301b that is forwarded to a setp cache 315. In an example of a 64-bit addressing, the address part 301a might be "LA.50:55" and the address part 301b might be "LA.37:55".

Reference numeral 304 depicts component, that forwards, via line 301a, a signal towards the memory bank 320.

In an embodiment, the setp cache 315 keeps the most recently accessed set predict array entries of the set predict array 370. In other words, the setp cache may be regarded as a kind of cache for the set predict array.

The set predict array cache 370 entries contain the same tag information as the set predict array, the L1 row index and the set ID information.

This means that the setp cache 315 may be able to hold set predict array 370 entries from different rows at the same time. When all entries of the setp cache 370 are valid, a least recently used, LRU, algorithm is used to select the entry to be overwritten, but alternatives like a round robin solution could also be used.

The setp cache may be a very small cache or pre-cache. In embodiments, it is considered to have as few as six entries.

When a hit is detected in the setp cache 315, it is not necessary to employ the set prediction array 370, which may, thus, be powered down. Also a part 320B of memory bank 320 may be powered down, when the setp cache hit is associated with a set that is located in part 320A of memory bank 320.

In embodiments, a function of the setp array might be used wherein the setp array does not itself calculate the late select data, but only forwards them via a separate input. The setp cache may memorize, for the cached setp entries, the late select that has been calculated by the setp array.

As a result, because the set predict array 370 and part 320B of the memory bank 320 may be switched off, as indicated by the hatched presentation, power consumption may be reduced.

Figure 5:
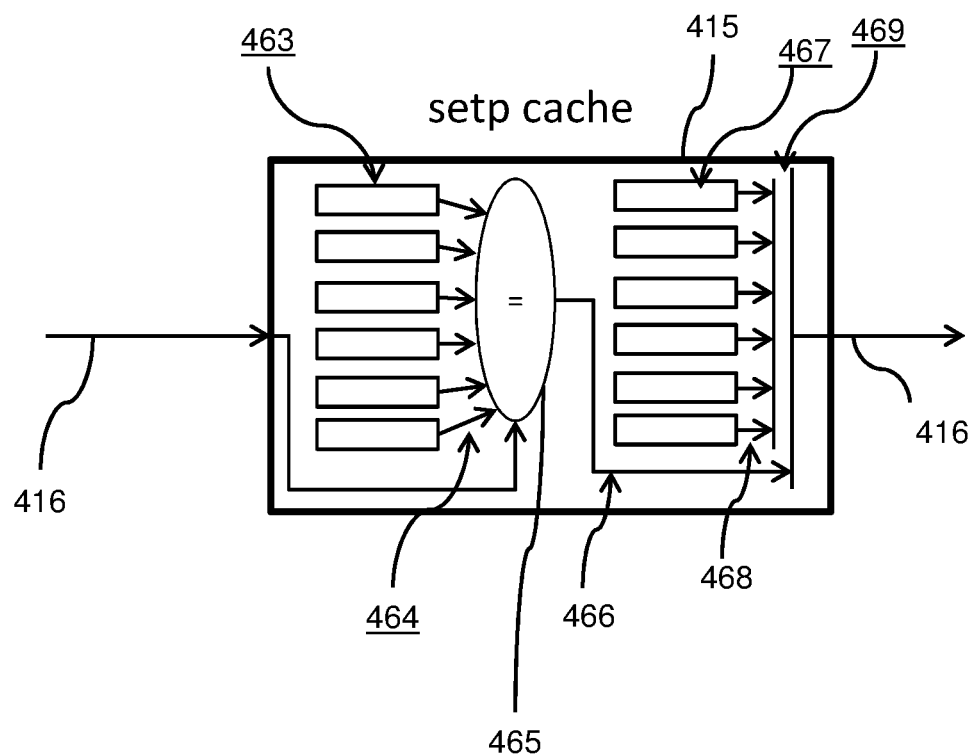
FIG. 5 shows as a block diagram parts of the internal structure of the setp cache.

FIG. 5 depicts as a block diagram parts of the internal structure of the setp cache 315, herein referred to by reference numeral 415.

A sub-part of the main memory address may be forwarded via line 416 towards and input into the setp cache 415. Setp cache 415 may comprise multiple entries or registers or address registers 463 of some memory addresses, or, sub-parts of memory addresses, that were found in recent accesses. The setp cache 415 may be associative, in that the entries 463 may be compared in a comparator 465 to the reference sub-part of the main memory address 416. In other words, the cooperation of the registers 463 with the comparator 465 may be regarded as content accessible memory, CAM. If there is a hit, this information, "hit", is forwarded to via line 466 towards a multiplexer structure 469.

In the set registers denoted 467, set id's, SID, may be stored that correspond to the sub-parts of the addresses stored in the registers 463. In the case, a hit is detected, the multiplexer 469 may select the corresponding set register so that the correct ("hit") set id may be output via line 416. This mechanism works analogously to the mechanism described above with regard to the functionality of cache 100.

In an embodiment, a logical address forwarded via line 416 towards setp cache 415 may contain a logical address LA.37:55. Valid entries in the address registers 463 may, thus, be denoted abbreviatedly VA37:55, "V" denoting "virtual".

As the setp cache stores results of the calculations of the setp array, there is no need to re-execute these calculations when using the setp cache. The setp cache will recognize this situation and will toggle the setp array into a mode, wherein it does not calculate, but will only forward the late select from specific input pins.

In embodiments, it it considered that setp cache 315 may additionally be able to switch off setp 370 and at least one other line is arranged via which part of the cache, i.e., a half of the memory bank 320, may be switched off.

Figure 6:
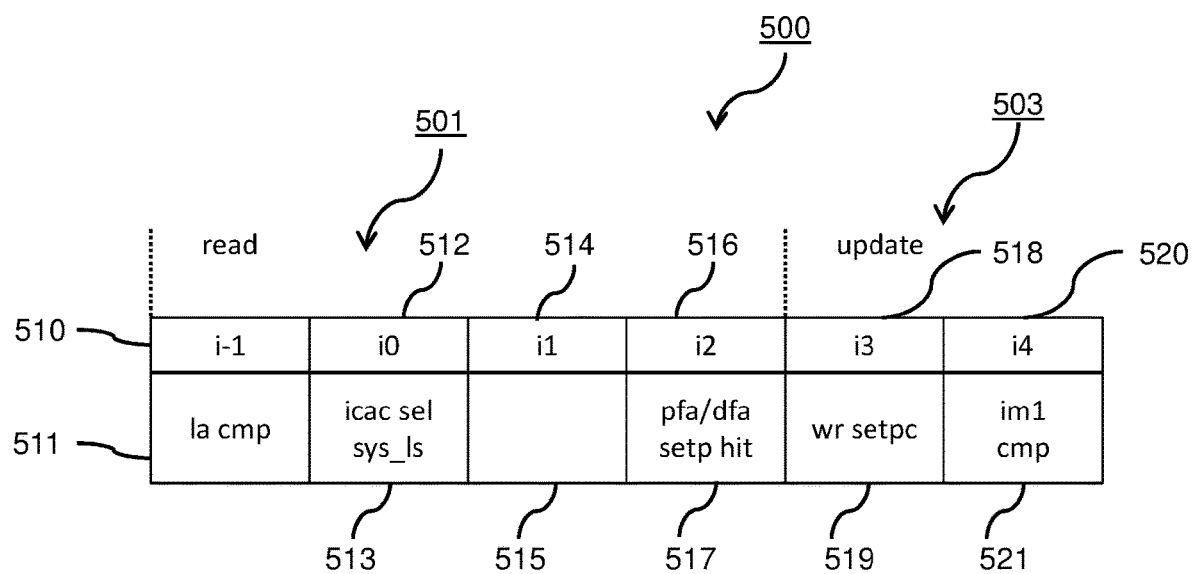
FIG. 6 exemplarily depicts an integration of the arrangement of one of the aforementioned embodiments into the cache access pipeline.

FIG. 6 exemplarily depicts an integration of the arrangement of one of the aforementioned embodiments into the cache access pipeline.

The setp cache pipeline 500 comprises two phases, i.e., a read phase 501 and an update phase 503. The setp cache pipeline further comprises, in a clock 510, "i−1", an action 511, "la cmp", that may refer to a comparison 465 of a logical address forwarded via line 416 to the already stored addresses, stored in registers 463.

In clock cycle 512, "i0", an action 513, "icac se1; sys_1s", may be performed. If a match is found, i.e., subpart 416 of the requested main memory address is already contained within one of the registers 463, the set id, SID, may be taken from the corresponding SID register 467 and may be forwarded via line 416. In this case, it may be not necessary to power up the complete set predict array 320. It may be sufficient to only power up the memory bank 320A, that contains a set entry corresponding to the required address. On the other hand, at the same time, memory bank 320B not containing the requested set ID and/or the corresponding logic circuitry may be switched off. This means that unnecessary parts of the set predict array 370 may be powered down.

Clock cycle 514, "i1" might trigger no action, 515, with respect to the setp cache 415.

In clock cycle 516, "i2", an action 517 is taken that might comprise a pre-fetch address, PFA, and a demand fetch address, DFA, referring to independent pipelines accessing the instruction cache.

In clock cycle 518, "i3", an action 519, "wr setpc", may be taken. This happens only, if no hit was found in the steps before and a need for an update of the setp cache 415 arises. When the fetch to the main memory or higher level cache is performed, the relevant part of the address of the loaded data, or: instruction, is written into one of registers 463 of setp cache 415.

In clock cycle 520, "i4", an action "iml; cmp" may be performed. In other words, in order to write a new entry into the setp cache, it is necessary to first know the result of the setp-lookup. Line 510 depicts cycles of a cache access that represents writing a setp cache entry. I.e., in cycle i−1 an LA compare takes place. The result of this comparison decides as to whether a setp cache entry is to be used, or, whether the late select calculates the data. The cycle i4 is the very cycle, wherein a subsequent cache access may use the new setp cache entry for the very first time. This is illustrated by the i−1-compare in line 511.

To summarize, in other words: In i−1 the setp cache is accessed and provides its hit information in i0 to suppress powering up the set predict array. If the setp did not hit, in i3 of the pipe pass (which had to use the set predict array) the setp cache gets updated such that the first fetch pipe pass which can benefit from the new setp cache entry has its i−1 in i4 of the access which required to access the set predict array.

What is claimed is:

1. A computer implemented method for saving cache access power, the cache being provided with a set predictor logic for providing a generated set selection for selecting a set in the cache, and with a set predictor cache for pre-caching generated set indices of the cache, the method comprising:

receiving a part of a requested memory address, wherein the requested memory address is an address in a higher level memory that is at least one of a higher level cache or a main memory;

checking, in the set predictor cache, whether the requested memory address is already generated, wherein checking is performed on an associative basis, comparing a hitting stored address parts in the set predictor cache with the received part of the requested memory address;

in the case, that the requested memory address has already been generated:

securing that a set predict cache is switched off by switching off the set predictor cache, or, leaving the set predictor cache switched off, when the set predictor cache is switched off, then switching the set predict array on, and, when the set predictor cache is switched on, then switching the set predict array off;

issuing a pre-cached generated set index towards the cache by bypassing the set predictor logic;

securing that only that a part of the cache is switched on that is associated with the pre-cached generated set index by switching off or leaving switched off a part of the cache that is not associated with the pre-cached generated set index;

wherein the cache is at least one of an instruction cache, a data cache, an L1 level cache, an L2 level cache, an L3 level cache;

wherein the received part of requested memory address is partitioned into a tag and an index; and wherein the part of the cache switched-on is a set or a number of sets of the cache.

* * * * *